J. W. JACOBS.
Glass-Polishing Apparatus.
No. 217,945.  Patented July 29, 1879.
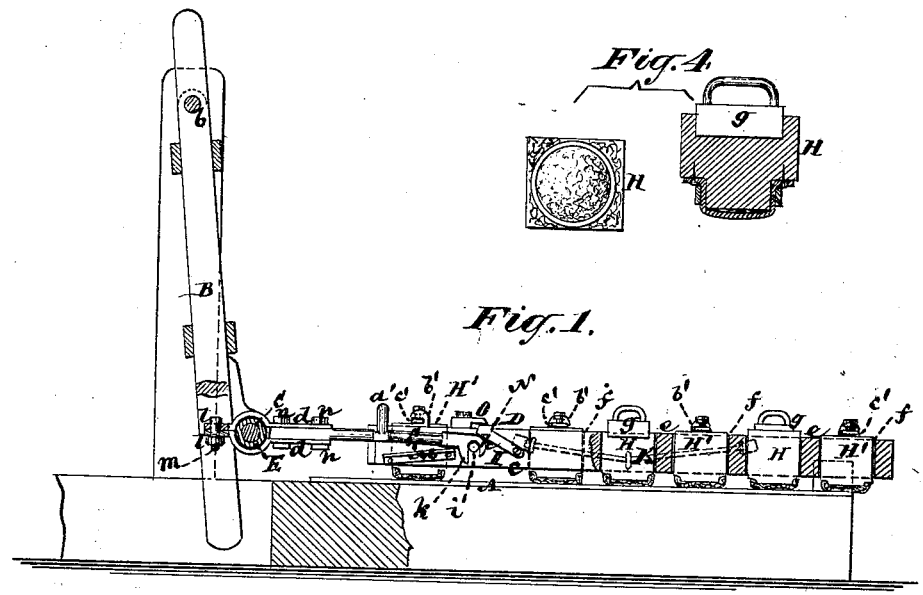
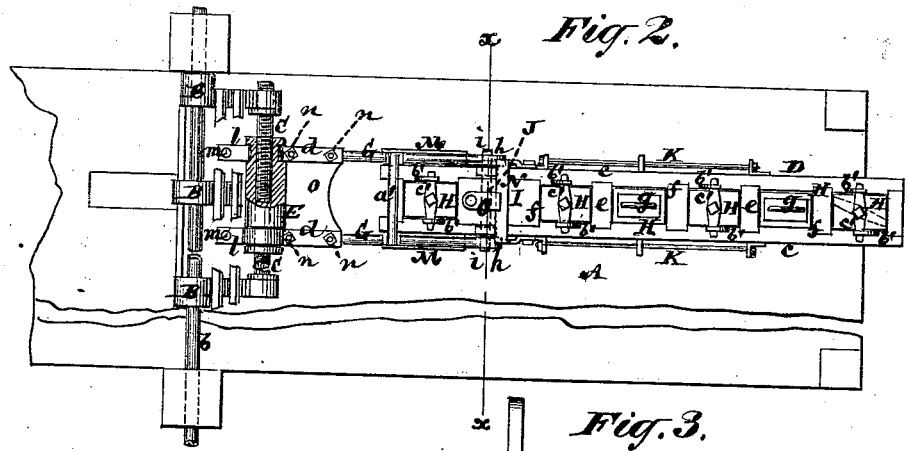
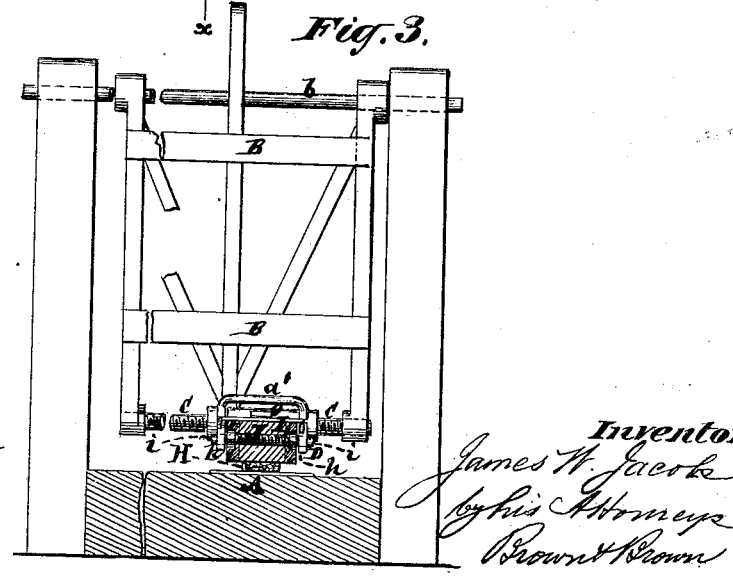

UNITED STATES PATENT OFFICE.

JAMES W. JACOBS, OF JEFFERSONVILLE, INDIANA, ASSIGNOR TO HIMSELF AND WILLIAM S. JACOBS, OF SAME PLACE.

IMPROVEMENT IN GLASS-POLISHING APPARATUS.

Specification forming part of Letters Patent No. 217,945, dated July 29, 1879; application filed January 3, 1879.

*To all whom it may concern:*

Be it known that I, JAMES W. JACOBS, of Jeffersonville, in the county of Clarke and State of Indiana, have invented certain new and useful Improvements in Apparatus for Polishing Plate-Glass, of which the following is a full, clear, and exact description, reference being had to the accompanying drawings, forming part of this specification.

This invention relates to apparatus for polishing plate-glass, in which a series of frames fitted with polishing-blocks are attached side by side, or "in lines," as it is termed, to a swinging gate, in such manner that they have a reciprocating motion in direction of their length simultaneously with a traversing motion in a transverse direction thereto, for the purpose of polishing the plate or plates of glass stationary on a table, over which said frames of polishing-blocks are arranged to move.

The invention consists in certain novel constructions and combinations of the frame which carry the polishing-blocks, loaded and unloaded polishing-blocks fitting said frames and interchangeable one with the other, and means for readily shipping and unshipping the frame, when required, whereby a more equal and better distribution of the weight on the glass is obtained, the various necessary changes in distribution of the polishing-blocks, or removal of them for washing, and stoppage of the polishing-frame are provided for without stopping the apparatus, likewise liability to breakage of the glass is avoided, and other advantages are obtained.

In the accompanying drawings, Figure 1 represents a partly-sectional side elevation of an apparatus, in part, for polishing plate-glass constructed in accordance with my invention, and showing only one line or frame of polishing-blocks as attached to the swinging gate. Fig. 2 is a partly-sectional plan of the same, and Fig. 3 a transverse section thereof on the line *x x*. Fig. 4 represents an under view and longitudinal section of a modification of the polishing-blocks.

A is the table upon which the plate of glass to be polished is placed; and B, a swinging gate, arranged to rock upon an upper shaft, *b*, and actuated by any suitable means. C is the screw on the gate used in other plate-glass-polishing apparatuses for giving the necessary traversing motion in a transverse direction to the lines or frames of blocks, as said frames are reciprocated by the swing of the gate in direction of the length of the table. Only one frame, D, of blocks is shown in the drawings. Said frame is as much shorter than the table as the length of the swinging motion of the gate at the connection of the latter with the frame.

E represents a brass box, arranged to fit the screw C, for giving the necessary traversing motion in a transverse direction to the frame D of polishing-blocks. G G are pitmen or rods, connected by straps *d* with the box E, and serving to communicate the requisite longitudinal reciprocating motion to said frame from the gate B.

Each frame D is composed of oak sides *c* and cross-pieces *e*, forming baskets or openings *f* for the polishing-blocks. These baskets, which are arranged one in advance of the other, are of slightly larger dimensions than the blocks H H', which enter down within and through them, and are of uniform dimensions with each other, so that any one of said blocks will fit any one of said baskets. These blocks, of which any number may be used at any one time, are of such length and so spaced that in the swing of the gate each block will move two-thirds, more or less, over the surface traveled by the preceding or next adjacent block, which overlapping action is necessary to give a perfect polish. Said blocks are for the most part made of wood faced with felt, and are not wholly dependent upon their weight for the necessary pressure, which is mainly given by the frame D, thus differing from the usual weighted blocks, although certain of them— those marked H—carry weights *g*, and these I term "weighted blocks," and the others, H', which have no weights, "bearing-blocks." The general pressure, however, of the blocks on the glass is dependent upon the weight of the frame D, whereby an equal distribution of weight is obtained over the whole surface to be polished.

The frame D has firmly secured between its sides or rails, near the rear end thereof, a solid head-block, I. A hole is bored transversely through this block and the sides $c$ of the frame, and a shouldered bolt, J, screwed into and through the hole in said block and secured by nuts, and leaving journals $i\,i$ extending beyond the sides of the frame for the pitmen or rods G G to engage with. The solid head-block I serves to give a secure coupling or connection for the pitmen or rods G G with the gate B by or through the bolt J. The pitmen or rods G G are constructed at their front ends with hooks $h\,h$, opening below for engagement from above with the journals $i\,i$, and formed with their jaws $k\,k$ of greater length than their other jaws, $h\,h$.

Straps $d\,d$, which connect rods G G with the box E on the screw C, are made in two upper and lower longitudinal sections or halves, and each of said sections has its rear end at the back of the box formed with a lug or projection, $l$. A taper pin, $m$, passes through a taper hole in these projections $l$, and the front portions of the straps, which receive within them the back portions of the rods G, have bolts $n$ passing through them and said rods. By taking out the taper pin $m$ and the bolts $n$ the rods G, straps $d$, and screw-box may be removed without raising the screw C. The rods G may have a stiffening cross-bar or plate, $o$, in between them.

M M are inclined planes or plates secured to the sides $c$ of the frame D, beneath the bars G, and so arranged that when the rods G are engaged by their hooks $h$ with the journals $i$ said inclined planes or plates come immediately beneath the rods G.

A lock-bar, N, pivoted to the sides of the frame D, rests upon or over the hooked ends of the rods G to hold the latter in lock with the journals $i$; and to secure said lock a button, O, may be pivoted to the head-block I for holding down the lock-bar N.

To uncouple a line or frame of blocks while the apparatus is in motion, which is important, the button O is turned from its hold on the lock-bar N, and the latter swung back or raised. The hand is then applied to a cross-handle, $a'$, attached to the rods G, and the hooked ends $h$ of said rods are raised from the journals $i$, and said rods raised or turned back until they come against the gate B, where they may be tied.

To couple a line or frame of blocks, steadily lower the hooked rods G, and when the latter are in line with the sides of the frame D allow the longer jaws $k$ of the hooks $h$, as the gate B is swinging forward, to come upon the inclined plates M. Said rods G will then, by the jaws $k$ of the hooks $h$ running up and along the plates M, be directed till said jaws clear the upper ends of the inclined plates M, when the hooked ends $h$ will drop into engagement with the journals $i$. After this, with one hand upon the cross-handle $a'$, the other hand may be employed in turning down the lock-bar N and adjusting the button O, to secure the engagement of the rods G with the journals $i$.

Thus the frame D of blocks may be readily engaged and disengaged while the apparatus is in motion without danger of breaking the glass on the table A.

Attached to the top of each side rail of the frame D, opposite the center of the baskets $f$, or certain of them, are opposite-side reverse-hooks $b'$; and attached to the tops of the bearing-blocks H' are pivoted locking-bars $c'$, which may be turned to engage with or disengage from said hooks $b'$, for the purpose of keeping said bearing-blocks down within the baskets $f$ or of removing them therefrom, as required. When said bearing-blocks are engaged with the frame D by the reverse hooks $b'$ and bars $c'$, then said blocks get their requisite pressure on the glass by the weight of the frame D. The other blocks, H, which have weights $g$ embedded in them, do not require to be locked down in their baskets, and have handles $d'$ to remove them when required. All the polishing-blocks have about equal weight upon the glass, so that there is a corresponding degree of friction or pressure throughout.

The bearing-blocks H' and weighted blocks H may be used in concert, as follows: When but two bearing-blocks H' are used, and it is found that they are working up too fast, heating the glass faster than the other blocks, one of the weighted blocks H is removed, and a bearing-block, H', put in its place, thus more equally distributing the weight of the frame D.

To wash the bearing-blocks, which is necessary from time to time, I put a bearing-block, H', in a basket, $f$, having hooks $b'$ at its sides, nearest to the basket having the bearing-block which it is designed to wash, and locking the one block and unlocking and removing the other, wash the latter, and, if necessary, remove the temporary bearing-block and replace it with a weighted one. All this may be done while the apparatus is in motion.

By this mode of blocking a line of framework, I have complete control of every block in the line or frame, and am enabled to equally distribute the weight, so as to make all the blocks work up together, and so prevent breakage of the glass. The means, too, which I have described for operating the frames of blocks from the gate do away with the jerk or irregularity consequent upon wear, and thereby further lessen the liability to breakage of the glass.

Fig. 4 represents a weighted polishing-block of circular form at its lower end, but flat on its face, felt being applied to the latter, and suitably secured, in part, by pins or bolts, and in part by a metal ring, arranged to secure the felt on and over a boss or circular projection on the face of the block.

Blocks thus constructed may be used to advantage in place of blocks having rectangular faces.

Re-enforce rods or braces R, passing through eyes in the sides of the frame D, may be applied to stiffen said frame against sagging or springing.

Felting or other soft cushioning material may be arranged on the under side of the frame D, at its ends and middle, to soften the contact of said frame with the glass when the polishing-blocks are removed.

I claim—

1. In an apparatus for polishing plate-glass, the combination, with the gate B, of the frame D, having a series of baskets or apertures, $f$, one in advance of the other, and of equal dimensions or thereabout, the weighted or loaded polishing-blocks H, free to rise and fall in such baskets, the unloaded bearing-blocks H′, also freely fitting said baskets, and means for holding and releasing said bearing-blocks to and from their places in said frame, substantially as and for the purposes specified.

2. The traveling frame D of polishing-blocks constructed with a solid head-block, I, in combination with a bolt, J, having projecting ends or journals, the pitmen or rods G, for operating said frame, constructed with hooks $h$ at their forward ends, having elongated jaws $k$, and the inclines or plates M on the sides of the traveling frame, essentially as described.

JAMES W. JACOBS.

Witnesses:
WM. S. ROLL,
N. H. BIRNBAUM.